(12) United States Patent
Leibold

(10) Patent No.: US 6,780,214 B2
(45) Date of Patent: Aug. 24, 2004

(54) MOTORCYCLE CARBURETOR AIR INTAKE SCOOP

(75) Inventor: David Leibold, Marysville, WA (US)

(73) Assignee: David K Liebold, Everett, WA (US)

( * ) Notice: Subject to any disclaimer, the term of this patent is extended or adjusted under 35 U.S.C. 154(b) by 0 days.

(21) Appl. No.: 10/314,922

(22) Filed: Dec. 6, 2002

(65) Prior Publication Data

US 2004/0107680 A1 Jun. 10, 2004

(51) Int. Cl.[7] ............................................. F02M 35/024
(52) U.S. Cl. ............... 55/385.3; 55/385.7; 55/DIG. 28; 123/198 E; 261/64.1
(58) Field of Search ...................... 261/64.1; 123/195 C, 123/184.21, 198 E, 195 E; 55/385.3, 385.7, DIG. 28

(56) References Cited

U.S. PATENT DOCUMENTS

| | | | | |
|---|---|---|---|---|
| 1,751,686 A | * | 3/1930 | Duerk | 454/159 |
| 1,828,816 A | * | 10/1931 | Pierson | 96/338 |
| 1,944,279 A | * | 1/1934 | Skelton | 55/475 |
| 3,898,066 A | * | 8/1975 | Miskiewicz | 55/317 |
| 4,066,720 A | * | 1/1978 | Carter | 261/44.3 |
| 4,592,316 A | * | 6/1986 | Shiratsuchi et al. | 123/195 C |
| 5,042,603 A | * | 8/1991 | Olson | 180/68.3 |
| 5,549,085 A | * | 8/1996 | Endrigo | 123/184.21 |
| 5,868,808 A | * | 2/1999 | Henderson | 55/336 |
| 6,371,068 B2 | * | 4/2002 | Taylor | 123/184.21 |

OTHER PUBLICATIONS

* References X'd were cited by applicant in specification.*

* cited by examiner

Primary Examiner—Richard L. Chiesa
(74) Attorney, Agent, or Firm—Donald W. Meeker

(57) ABSTRACT

An air intake scoop for a motorcycle carburetor inserts into the carburetor mouth while also fitting within the air filter housing. The air scoop being designed with a cutout in front, a ridge along the interior and a 90-degree angle for the ability to draw a strong airflow into the carburetor, preventing gas mist from escaping from the carburetor. This air intake scoop would be molded preferably of polyurethane or other gas and oil resistant plastic or rubber, and would be easily adapted to fit a variety of different sizes of carburetors and air filter housings. An air filter cover with a forward air opening admits a strong current of air into the air filter and air intake scoop on clear days and has a closeable lid to prevent water from entering the carburetor on rainy days.

8 Claims, 2 Drawing Sheets

MOTORCYCLE CARBURETOR AIR INTAKE SCOOP

BACKGROUND OF THE INVENTION

1. Field of the Invention

The present invention relates to air intake for carburetors, and more particularly, to an air intake scoop for a motorcycle carburetor which inserts into the carburetor and fits within the air filter housing.

2. Description of the Prior Art

In motorcycle carburetors mounted with a horizontal opening, such as Harley Davidson models of 883 cc, 1400 cc, and 80 ci depending on which motor combination, pipes, cam with valve overlap, a problem that can occur in some instances is that a gas mist comes out of the carburetor when accelerating allowing gas to saturate the air filter with a gas mist and then the gas will drip down the side of the motorcycle causing gasoline odors, possible paint damage, stains, and a potential fire hazard.

Prior art air intakes in most instances do not address the problem of gas misting from the carburetor.

Prior art intakes do not direct the airflow into the carburetor from inside the air filter area with an enclosed shroud forcing the air into the carburetor improving the performance of the motor.

U.S. Pat. No. 4,592,316, issued Jun. 3, 1986 to Shiratsuchi, et al., describes an air funnel assembly extending between an air inlet assembly and one or more carburetors on a two-wheeled vehicle. The air funnel assembly includes an elastic air funnel and an air funnel cover. The funnel and funnel cover are affixed to the carburetor or carburetors and extend in spaced relation towards the air inlet assembly. The components may be fixed to the carburetors by means of one or more clamp rings, may be additionally joined together by projections from the elastic funnel which are retained in holes in the rigid cover. A radially interlocking arrangement may be employed at the inlet from the air inlet assembly to retain the funnel thereto.

U.S. Pat. No. 5,868,808, issued Jan. 9, 1999 to Henderson, shows a carburetor air intake velocity stack engagable with a carburetor inlet, that has a cylindrical throat section having first and second ends. The first end is adapted to be coupled to the carburetor, while the second end is open to the air. A shaped, mesh filter having an effective open area which exceeds the open area of the velocity stack by at least about 50%, is located within said air intake velocity stack. The filter has a cylindrically formed flange member which is trapped between said air intake velocity stack and the carburetor.

U.S. Pat. No. 6,371,068, issued Apr. 16, 2002 to Taylor, claims a modified air intake mechanism for an internal combustion engine. The air intake mechanism includes an air passageway that contains a fixed vane located in a plane that is parallel to the air flow within the passageway. More specifically, the vane is stationary and is located in the air horn or the air intake passageway of the cylinder head.

U.S. Pat. No. 4,066,720, issued Jan. 3, 1978 to Carter, provides an improved carburetor air intake velocity stack for maximizing the quantity of air delivered to a carburetor. An air intake velocity stack is adapted to be coupled to the air inlet of a carburetor, the surface of the air intake stack substantially eliminating turbulence at the air intake velocity stack as well as increasing the density of air being input to the carburetor. The curvature of the intake stack provides for substantially laminar flow of the input air, the laminar flow being undisturbed by the shape of the input path.

U.S. Pat. No. 5,549,085, issued Aug. 27, 1996 to Endrigo, discloses an insert device for smoothing air flow from air filters to carburetors. The device is suitable for turning an air stream from an intake air passageway, which is directed inwardly along a plane from a periphery towards a center to a fuel/air mixing chamber having an annular downwardly flowing mixing passageway with a longitudinal axis at the center. The insert device includes a first end adapted to be operably located concentrically with the annular fuel/air passageway, and a second end opposite the first end. The first and second ends have a central axis extending therebetween. The second end has a center and an upper wall extending outwardly therefrom. A peripheral wall of diminishing outside diameter begins at a point spaced outwardly near the center of the second end and extends smoothly to a point of minimum diameter. From the point of minimum diameter, concave shaped subwalls of slightly increasing size extend downward to the first end. In an alternate embodiment, from the point of minimum diameter, a single peripheral wall of increasing diameter extends to and connects with the first end.

What is needed is a means for preventing gas from misting out of horizontally oriented motorcycle carburetor openings.

What is also needed is a means to prevent the air from flowing past the carburetor inlet. Air needs to be funneled directly into the carburetor, which improves performance.

SUMMARY OF THE INVENTION

An object of the present invention is to provide an air intake scoop to draw a strong flow of air into a motorcycle carburetor having a horizontal opening to force the flow of air into the carburetor and prevent the gas mist from exiting the carburetor.

Another object of the present invention is to provide a small-sized air flow scoop to fit onto the motorcycle carburetor and under the air filter.

One more object of the present invention is to provide an inexpensive air intake scoop molded preferably of polyurethane or other gas and oil resistant plastic or rubber.

An additional object of the present invention is to provide an air intake scoop which has 90 degree airflow movement to take in air from the forward direction of travel of the motorcycle and send it 90 degrees into the side mounted mouth of the carburetor.

A further object of the present invention is to provide a rubber or plastic air intake scoop which may be easily adapted to fit a variety of different sizes of carburetors and filters.

Yet one more object of the present invention is to provide a cover for the air filter with a movable lid over a forward opening in the cover to admit a substantial flow of air into the air scoop with the lid open on days when it is not raining and with the lid closed to prevent water from entering the carburetor on rainy days.

In brief, a sleeve elbow with a 90 degree bend is molded of polyurethane or other gas and oil resistant plastic or rubber. A circular opening fits with a tight friction fit inside the mouth of the carburetor which opens to the side of the motorcycle. A rim recessed from the circular opening acts as a stop and contacts the rim around the mouth of the carburetor.

The other end of the elbow faces in the forward direction of travel of the motorcycle to scoop in the air. The front facing portion of the elbow is cut away to create a larger scoop area extending from the rim to the outer tip of the elbow. A ridge protrudes along the inside centerline of the back surface of the elbow from the circular opening to the front edge of the scoop, the ridge acting as a vortex generator to assist in directing air flow into the mouth of the carburetor.

The air filter fits over the air intake scoop and bolts onto the carburetor backing plate in a normal fashion. A cover for the air filter is preferably bowl shaped and attractively chrome coated and fits onto the air filter with a single center bolt. A sliding lid in a front portion of the cover opens to admit air through a front opening in the cover in a strong current into the air scoop on clear days and closes to prevent water from entering the carburetor on rainy days.

An advantage of the present invention is that it funnels air directly into the carburetor, which improves performance while the vehicle is in motion.

Another advantage of the present invention is to provide a means to maintain a gasoline free air filter.

Another advantage of the present invention is to provide a means to prevent gas from dripping down from the carburetor.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
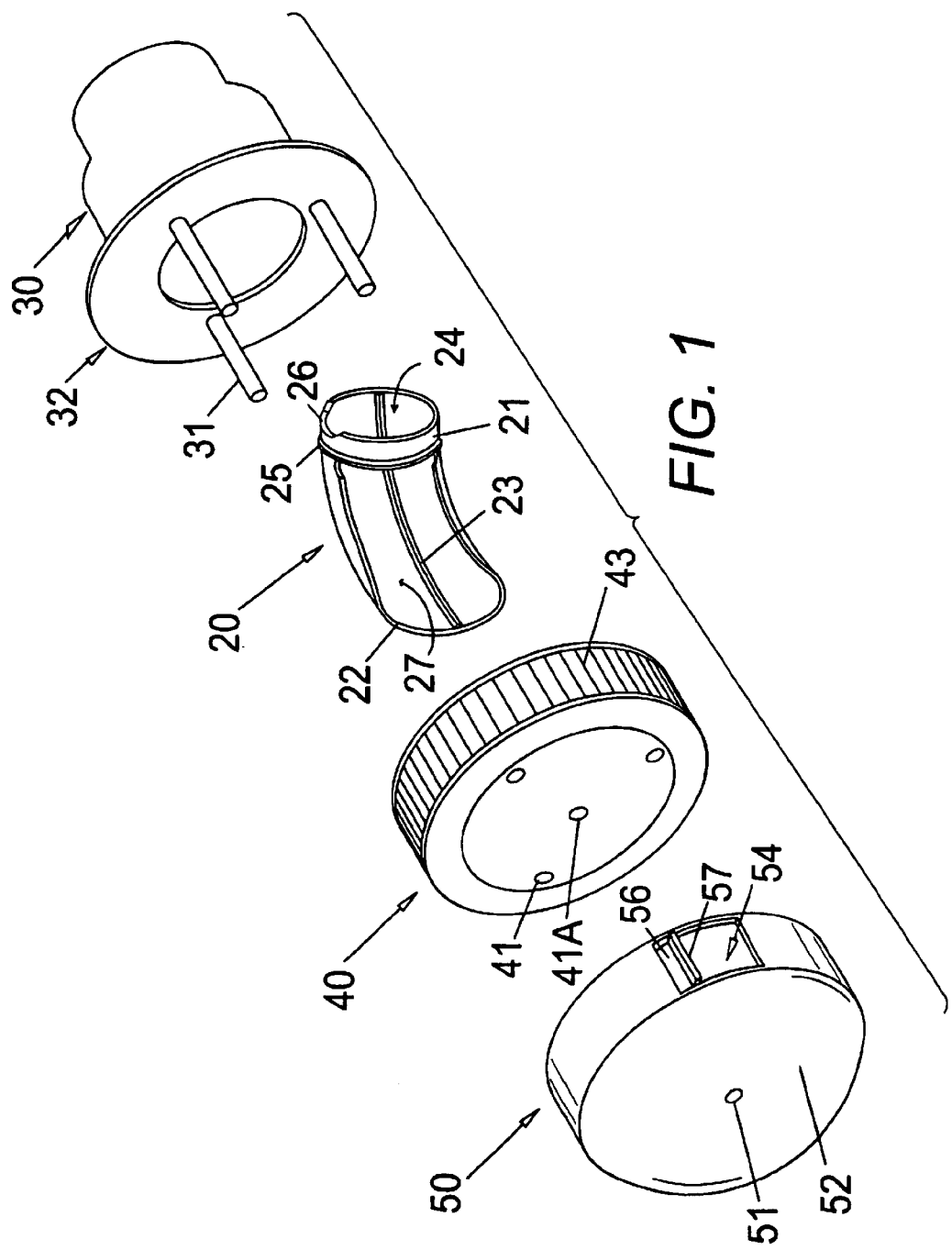
FIG. 1 is an exploded perspective view showing the air filter removed from the carburetor and the air intake scoop of the present invention adjacent to the carburetor.
Figure 2:
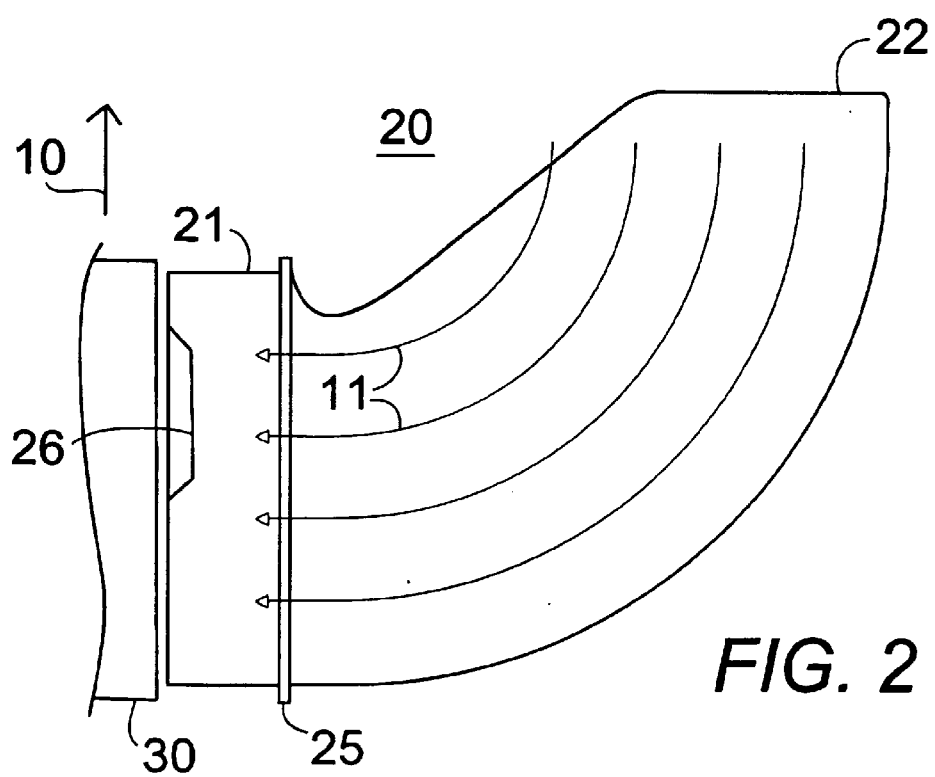
FIG. 2 is a top plan view of the air intake scoop with the scoop facing the direction of travel indicated by an arrow and having a series of arrows showing the direction of the air flow into the mouth of the carburetor.

In FIG. 1 and 2, an air intake scoop 20 device for a motorcycle carburetor 30 is configured to fit within an air filter housing 40 and to be attachable to the carburetor 30.

The air scoop 20 comprises, a circular opening 24 at one end encircled by a circular flange 21 capable of engaging an open mouth of a horizontally oriented motorcycle carburetor 30, and an air directing surface 27. The air directing surface 27 is an arched sleeve having a smooth arched curve, wherein a forward portion of the arched sleeve is cut away from the circular flange 21 to the second opening 22, exposing a rearward portion of the arched sleeve to have full exposure to the air. The arched sleeve has a central ridge 23 protruding from the arched sleeve along the rearward portion from the second opening 22 to the circular opening 24 to act as a vortex generator for improving air flow into the carburetor 30. The air directing surface 27 extends from the circular flange 21, changing orientation to the second opening 22 orthogonal to the circular opening 24. The second opening 22 is then capable of facing in the direction of travel of the motorcycle (shown by arrow 10 in FIG. 2). The air received within the second opening 22 flows to the air directing surface 27 which directs air into the open mouth of the carburetor 30, preventing fluids from exiting the carburetor 30.

The circular flange 21 has an edge notch 26 cut out of on the circular sleeve 21 adjacent to the circular opening 24. The edge notch 26 being configured to receive a carburetor breather valve (not shown) within the edge notch 26, this allows the circular flange 21 to be inserted into the mouth of the carburetor 30. The circular flange 21 also has a ridge 25 protruding externally around its outer edge. The ridge 25 being spaced apart from the circular opening 24 a sufficient distance, allows the circular flange 21 to be inserted within the mouth of the carburetor 30 for a tight friction fit, the ridge 25 forming a stop lip capable of abutting the mouth of the carburetor 30.

An air filter cover 50 for the air filter is preferably bowl shaped and attractively chrome coated and fits onto the air filter with a single center bolt through opening 51 in the cover and opening 41A in the air filter. A sliding lid 56 with a holding tab 57 fits over an air opening 54 in a front portion of the air filter cover 50. The lid 56 opens to admit air through the front opening 54 in the air filter cover 50 in a strong current into the air scoop 20 on clear days and closes to prevent water from entering the carburetor on rainy days.

The air intake scoop 20 device is formed preferably of polyurethane or of another gas impermeable and oil impermeable molded plastic or rubber, capable of being trimmed to fit within different sizes of air filters.

In practice, the air filter is removed from the studs 31 on the backing plate 32 of the carburetor 30. The nuts (not shown) are removed from the studs 31 which fit through the holes 41 in the bowl-shaped end plate 42 of the air filter 40 which has a thin circular rim 43 of air filter material. The circular flange 21 of the air scoop device 20 is pushed into the mouth of the carburetor 30 with a tight friction fit with the outer end 22 facing forward in the direction of travel of the motorcycle shown by arrow 10 in FIG. 2. The ridge 25 around the outside of the circular flange 21 abuts the mouth of the carburetor 30 and acts as a stop lip. The notch 26 accommodates the breather vent (not shown) in the mouth of the carburetor 30. The central ridge 23 along the interior of the air scoop 20 acts as a vortex generator to increase the effectiveness of the air scoop 20. The air filter 40 is re-installed over the air scoop 20 on the studs 31.

It is understood that the preceding description is given merely by way of illustration and not in limitation of the invention and that various modifications may be made thereto without departing from the spirit of the invention as claimed.

What is claimed is:

1. An intake scoop device for a motorcycle carburetor to fit inside the air filter housing, the device comprising:

an air scoop having a circular opening at one end encircled by a circular flange adapted for engaging an open mouth of a horizontally oriented motorcycle carburetor, and an air directing surface extending from the circular flange and changing orientation to a second opening orthogonal to the circular opening wherein the air directing surface comprises an arched sleeve having a smooth arched curve and a forward portion of the arched sleeve is cut away from the circular flange to the second opening to expose a rearward portion of the arched sleeve to have full exposure to the air, wherein the second opening is adapted for facing in the direction of travel of the motorcycle and receiving air within the second opening, and the air directing surface is adapted for directing air into the open mouth of the carburetor to prevent fluids from exiting the carburetor, the air scoop configured to fit within an air filter housing attachable to the carburetor.

2. The device of claim 1 wherein the arched sleeve further comprises a central ridge protruding from the arched sleeve along the rearward portion from the second opening to the circular opening to act as a vortex generator for improving air flow into the carburetor.

3. The device of claim 1 further comprising a ridge protruding externally around the circular flange, the ridge spaced apart from the circular opening a sufficient distance to allow the circular flange to be inserted within the mouth of the carburetor for a tight friction fit, the ridge forming a stop lip capable of abutting the mouth of the carburetor.

4. The device of claim 1 wherein the intake scoop device is formed of a gas impermeable and oil impermeable molded plastic capable of being trimmed to fit within different sizes of air filters.

5. The device of claim 1 further comprising an air filter cover adapted for fitting over the air filter, the air filter cover having a forward air opening with a slidable lid capable of fitting over the forward air opening the lid adapted for opening to admit air through the forward air opening in the air filter cover in a strong current into the air scoop on clear days and adapted for closing over the forward air opening to prevent water from entering the carburetor on rainy days.

6. An intake scoop device for a motorcycle carburetor to fit inside the air filter housing, the device comprising:

an air scoop having a circular opening at one end encircled by a circular flange adapted for engaging an open mouth of a horizontally oriented motorcycle carburetor, and an air directing surface extending from the circular flange and changing orientation to a second opening orthogonal to the circular opening wherein the second opening is adapted for facing in the direction of travel of the motorcycle and receiving air within the second opening, and the air directing surface is adapted for directing air into the open mouth of the carburetor to prevent fluids from exiting the carburetor, the air scoop configured to fit within an air filter housing attachable to the carburetor, wherein the circular flange has an edge notch cut out of on the circular sleeve adjacent to the circular opening, the edge notch being configured to receive a carburetor breather valve within the edge notch to allow the circular flange to be inserted into the mouth of the carburetor.

7. The device of claim 6 wherein the air directing surface comprises an arched sleeve having a smooth arched curve.

8. The device of claim 7 wherein a forward portion of the arched sleeve is cut away from the circular flange to the second opening to expose a rearward portion of the arched sleeve to have full exposure to the air.

\* \* \* \* \*